(12) United States Patent
Koperberg et al.

(10) Patent No.: US 11,718,404 B2
(45) Date of Patent: Aug. 8, 2023

(54) CONTAINER FOR AERIAL DELIVERY OF GOODS

(71) Applicant: Stichting Wings for Aid Foundation, Hilversum (NL)

(72) Inventors: Barry Willem Ferdinand Koperberg, Hilversum (NL); Henricus Alphonsius Cornelis Van Dorst, Delft (NL); Alexis Laurent Sebastien Roseillier, Utrecht (NL)

(73) Assignee: Stichting Wings for Aid Foundation, Hilversum (NL)

( * ) Notice: Subject to any disclaimer, the term of this patent is extended or adjusted under 35 U.S.C. 154(b) by 0 days.

(21) Appl. No.: 17/775,675

(22) PCT Filed: Nov. 11, 2020

(86) PCT No.: PCT/EP2020/081756
§ 371 (c)(1),
(2) Date: May 10, 2022

(87) PCT Pub. No.: WO2021/094368
PCT Pub. Date: May 20, 2021

(65) Prior Publication Data
US 2022/0281601 A1 Sep. 8, 2022

(30) Foreign Application Priority Data
Nov. 15, 2019 (NL) ..................................... 2024246

(51) Int. Cl.
*B64D 1/14* (2006.01)
*B64D 1/02* (2006.01)
*B64D 19/00* (2006.01)

(52) U.S. Cl.
CPC .................. *B64D 1/14* (2013.01); *B64D 1/02* (2013.01); *B64D 19/00* (2013.01)

(58) Field of Classification Search
CPC ... B64D 1/02; B64D 1/08; B64D 1/14; B64D 19/00
See application file for complete search history.

(56) References Cited

U.S. PATENT DOCUMENTS

| 2,450,992 A | 10/1948 | Sanderson |
| 3,168,267 A | 2/1965 | Ferris |

(Continued)

FOREIGN PATENT DOCUMENTS

| EP | 0653350 A1 | 5/1995 |
| WO | 2019059775 A1 | 3/2019 |

OTHER PUBLICATIONS

International Search Report and Written Opinion dated Feb. 11, 2021 for Application No. PCT/EP2020/081756.

(Continued)

*Primary Examiner* — Richard G Davis
(74) *Attorney, Agent, or Firm* — Patterson + Sheridan, LLP

(57) ABSTRACT

A container for dropping from an aerial vehicle in flight comprises an upper wall, a lower wall, a plurality of side walls, and a plurality of air brakes comprising flat panels. A plurality of side air brakes, wherein each side air brake is connected to a corresponding side wall at or near an upper edge thereof, is freely pivotable around a side air brake pivot axis at or near the upper edge of the corresponding side wall from a passive position, in which the side air brake extends substantially parallel to the corresponding side wall, to a deployed position, in which the side air brake extends substantially transversely relative to the corresponding side wall, by air flowing between the side air brake and the corresponding side wall. A top air brake is connected, with one edge thereof, to the upper wall or one of the side walls, and configured to extend substantially transversely from the upper wall to tilt the container during dropping around a (Continued)

horizontal axis for pivoting the side air brakes from the passive position thereof to the deployed position thereof.

20 Claims, 13 Drawing Sheets

(56) References Cited

U.S. PATENT DOCUMENTS

| | | | |
|---|---|---|---|
| 3,342,439 A | 9/1967 | Behrendt | |
| 5,577,689 A | 11/1996 | Haro | |
| 5,947,419 A * | 9/1999 | Warren | B64D 19/02 |
| | | | 102/388 |
| 6,712,317 B1 * | 3/2004 | Warren | B64D 19/00 |
| | | | 244/142 |
| 9,896,182 B1 * | 2/2018 | Beckman | G05D 1/105 |
| 2004/0051006 A1 | 3/2004 | Warren et al. | |

OTHER PUBLICATIONS

Netherlands Search Report and Written Opinion dated Jul. 14, 2020 for Application No. NL2024246.

* cited by examiner

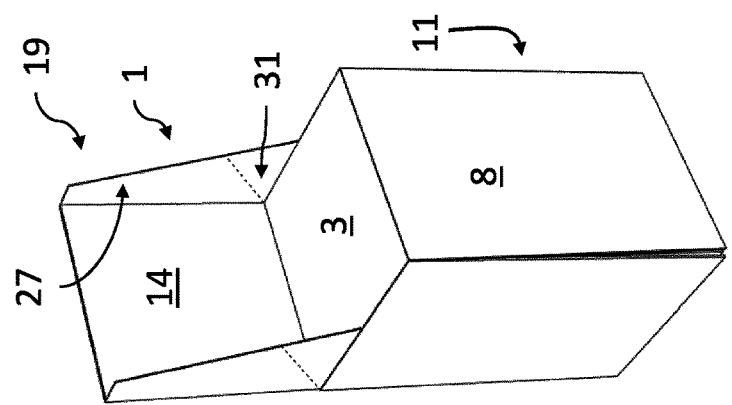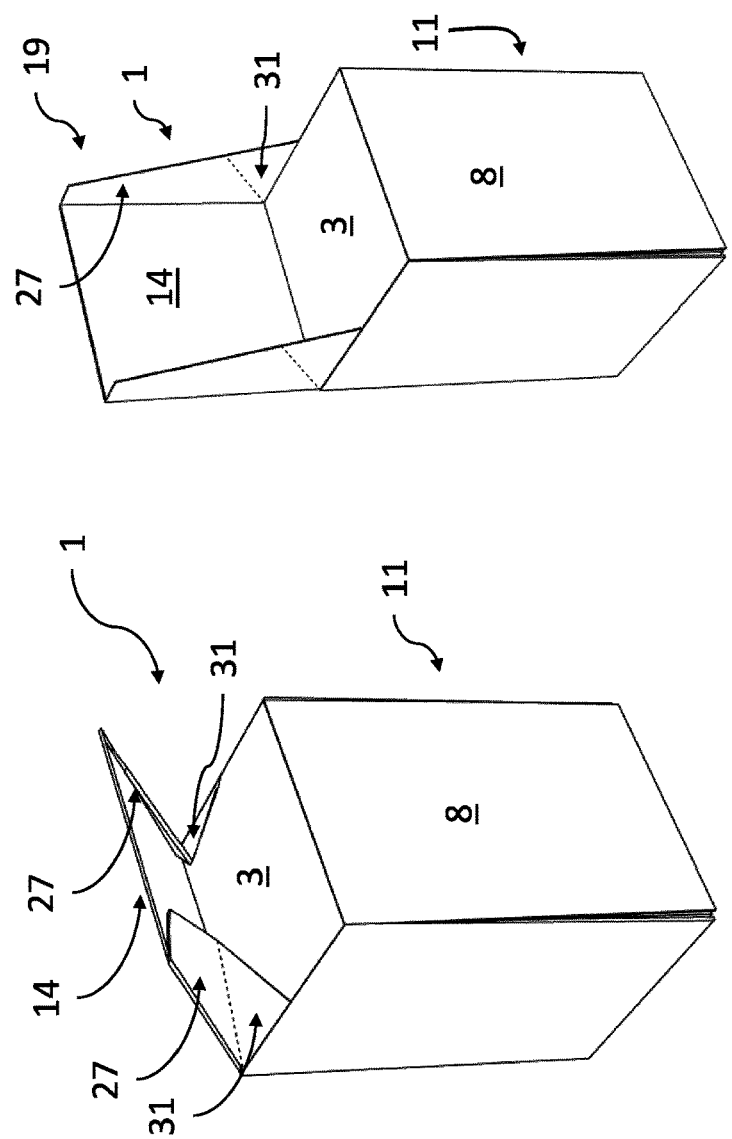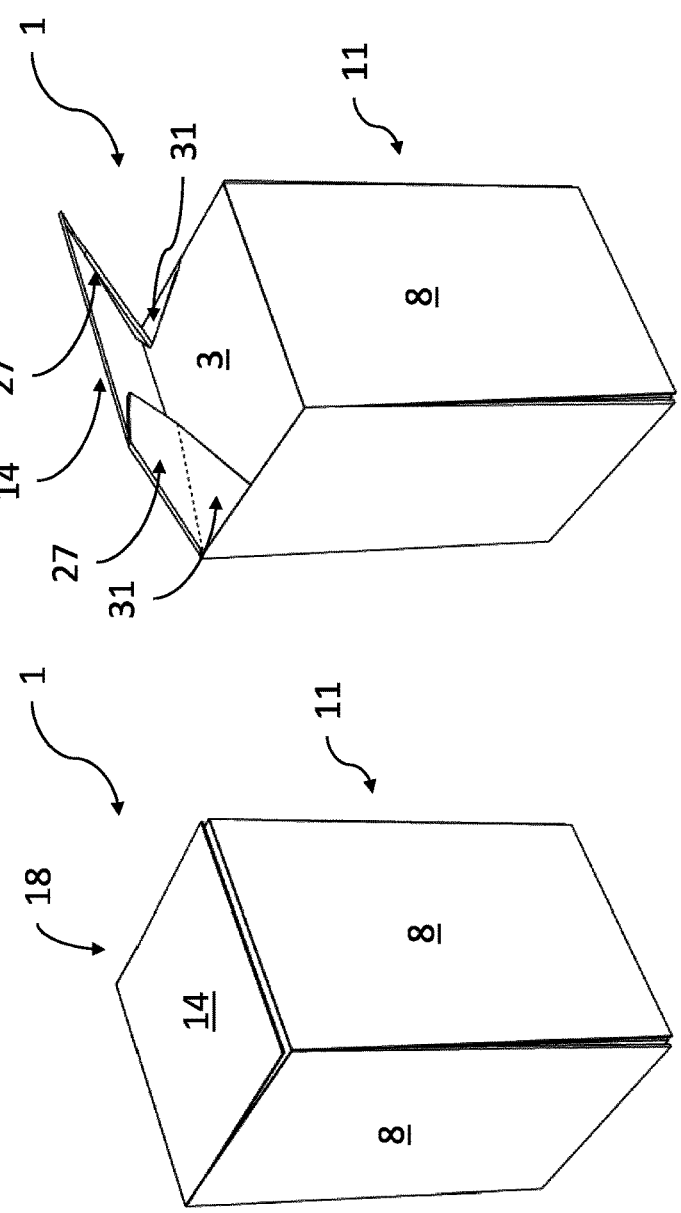

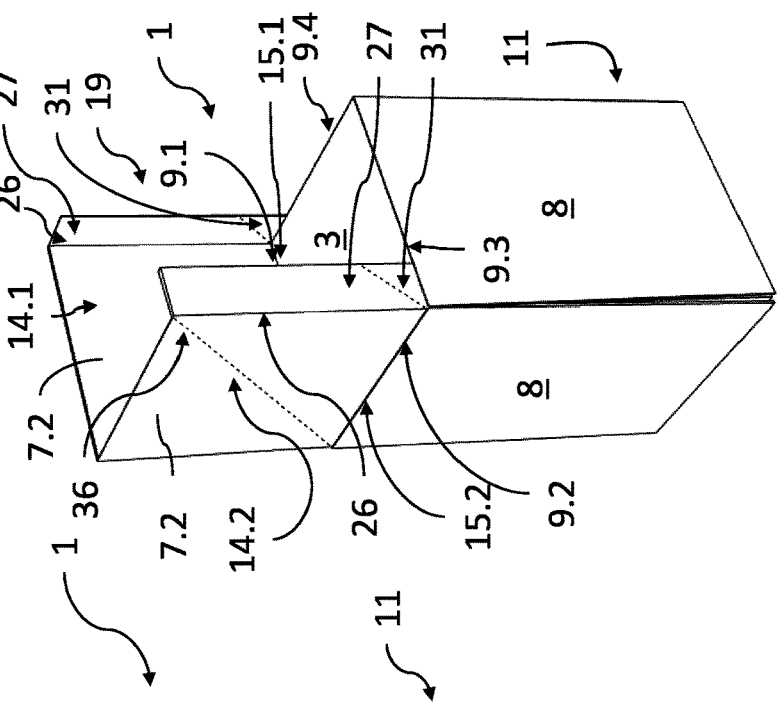
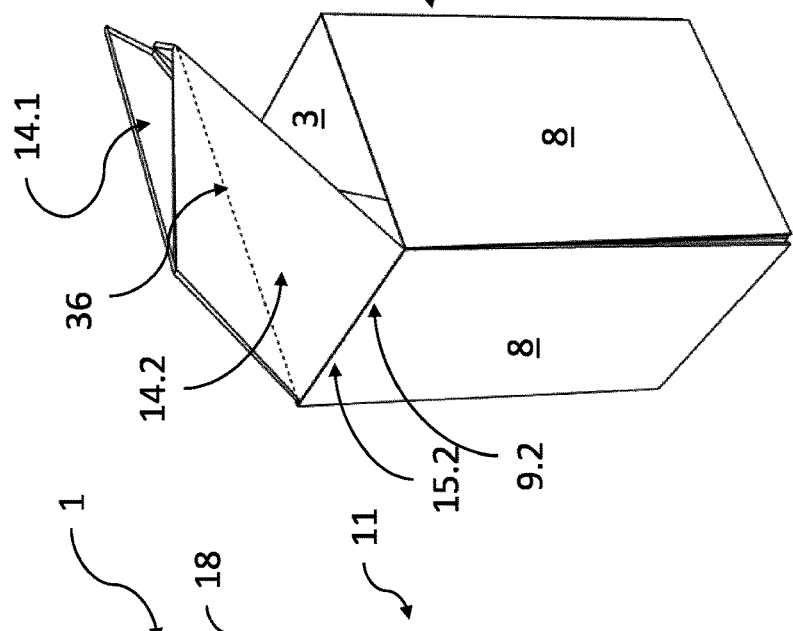
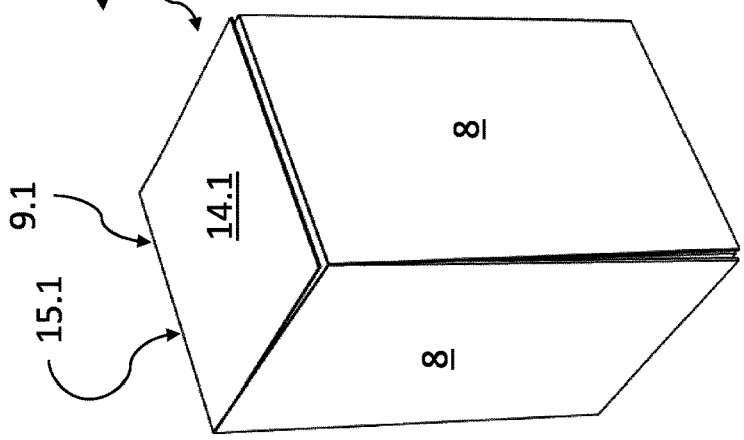

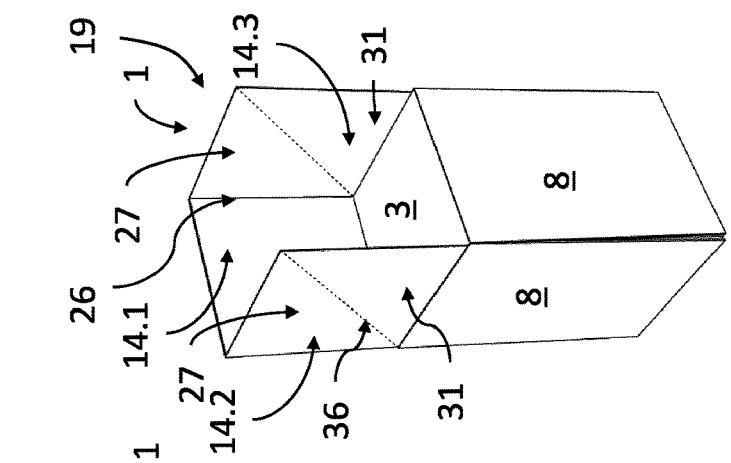
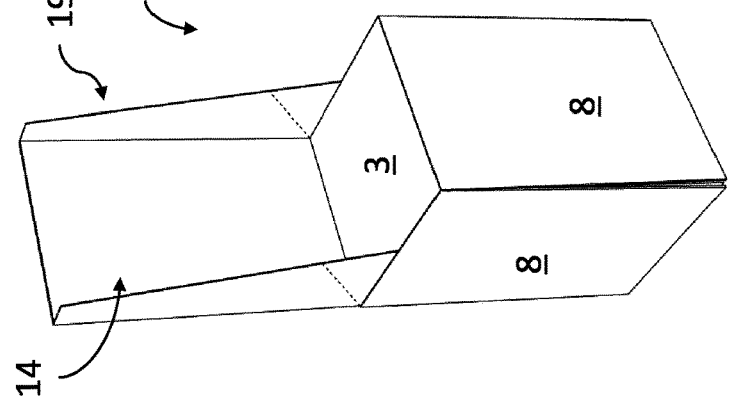
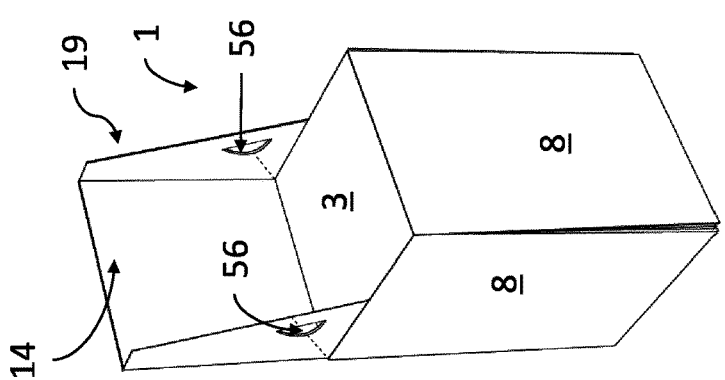
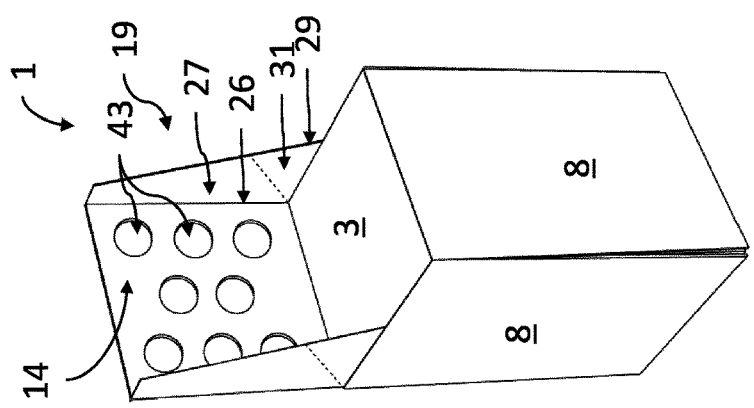

CONTAINER FOR AERIAL DELIVERY OF GOODS

The invention relates to the field of containers designed for aerial deliveries of goods, in particular a container delivered by a manned or unmanned aerial vehicle.

BACKGROUND OF THE INVENTION

Humanitarian aid organizations and governments are confronted with crises ranging from natural disasters to man-made hazards. In such situations aid workers often face a lack of logistical organisation and infrastructure on site. Consequently, it is challenging to provide sufficient aid to people in need, safely, in time and within budget.

A solution to the abovementioned problem can be found in aerial deliveries of emergency packages, wherein the emergency packages may contain a variety of aid materials. Delivery of said humanitarian aid materials will be increasingly done by using unmanned aerial vehicles (UAV) such that there are no people facing direct risks. The UAV can drop the packages in a designated area. It is desirable to ensure that no damage is done to the contents of the package when it is dropped.

Reference WO2019059775A1 discloses a container for aerial delivery of goods. A disadvantage of the disclosed container is the instability during the drop-phase. This disadvantage is particularly present when the container is dropped by an aerial vehicle having a horizontal velocity, wherein the container initially has the same horizontal velocity, and follows a substantially parabolic descent trajectory. It may occur that not all air brakes open during the descent, causing a tumbling of the container.

Reference U.S. Pat. No. 9,896,182B1 discloses a package delivery system, wherein a package is launched from an Unmanned Aerial Vehicle by a launch mechanism so that the package follows a substantially vertical descent trajectory. The package comprises control surfaces which should be actively deployed by remote control in order to manoeuvre the package in an intended direction prior to landing. A disadvantage of the package of said reference is its complexity. Due to a multitude of parts which need to be assembled, it requires extensive work to manufacture. During flight of the package, the control surfaces need to be actively released to be unfolded, to perform their function. Therefore, this reference does not provide a simple and cost efficient solution, as needed for large scale operations, both from a manufacturing and an operational point of view.

SUMMARY OF THE INVENTION

It would be desirable to provide a container which allows deployment thereof by an aerial vehicle while maintaining the structural integrity upon landing of goods contained by the container. It would further be desirable to provide a container which is reliable during a parabolic descent trajectory.

It would yet further be desirable to provide a container which is easy to manufacture, easy to assemble by non-skilled personnel, while maintaining structural integrity, and which has a predictable performance of the container during operation. It would still further be desirable to provide a cost efficient container. It would also be desirable to provide a container which can be stored efficiently.

To better address one or more of these concerns, in a first aspect of the invention a container for dropping from an aerial vehicle in flight is provided, the container comprising:

an upper wall, a lower wall, and a plurality of side walls; and a plurality of air brakes, wherein each air brake comprises a flat panel, the plurality of air brakes comprising:

a plurality of side air brakes, wherein each side air brake comprises a longitudinal panel and is connected to a corresponding side wall at or near an upper edge thereof, and wherein each side air brake is pivotable around a side air brake pivot axis at or near the upper edge of the corresponding side wall from a passive position, in which the side air brake extends substantially parallel to the corresponding side wall, to a deployed position, in which the side air brake extends substantially transversely relative to the corresponding side wall, and in which a cross-section of the side air brake at right angles to a central longitudinal line of the side air brake extends horizontally when the container is in an upright position, whereby the side air brakes, in their deployed position, are configured to not rotate the container around a vertical axis during the dropping, and to keep the container in the upright orientation, wherein each side air brake is freely pivotable around the side air brake pivot axis, and that the plurality of air brakes further comprises:

a top air brake connected, with one edge thereof, to the upper wall or one of the side walls, and configured to extend substantially transversely from the upper wall, to tilt the container having a horizontal velocity during dropping around a horizontal axis for pivoting the side air brakes from the passive position thereof to the deployed position thereof by air flowing between the side air brake and the corresponding side wall.

The upper wall, lower wall, and plurality of side walls of the container may define a rectangular shape, having four side walls. The upper and lower walls be rectangular, and may in particular be square.

The side walls of the container may be rectangular. The width of a side wall may be smaller than a height thereof. The number of side walls preferably, but not exclusively, is three, four, six, or eight, wherein each side wall may have equal width and height.

The container comprises an upper section in which goods may be stored, and a lower section situated below the upper section and comprising an impact absorbing structure.

The top air brake is configured to extend substantially transversely from the upper wall. In particular, the top air brake may extend at an angle of at least 60 degrees, in particular at an angle of at least 75 degrees, and more in particular substantially perpendicular to the upper wall of the container.

In their deployed positions, the side air brakes extend substantially transversely relative to the corresponding side walls. In particular, the side air brakes may extend at an angle of at most 120 degrees, in particular at an angle of at most 105 degrees, and more in particular substantially perpendicular to the corresponding side walls of the container.

An advantage of the top air brake is that the probability of not having all side air brakes deployed is reduced. When dropping the container with the side air brakes in passive position from an aerial vehicle, usually at least a number of, but not necessarily all of the side air brakes will take their deployed position automatically by air flowing under the air brakes. When the container is dropped from the aerial vehicle having a horizontal velocity, the container experiences a horizontal airflow which tends to alter the orientation of the container. When the container is released, a lower part of the container experiences the horizontal air flow first.

This will cause the container to tilt about its horizontal axis in a forward direction. The air flow pushes the air brake corresponding to the front side (as seen in the direction of movement) against said corresponding side wall, preventing the deployment of the air brake, and due to the tilting of the container the free end of said side air brake is directed in the direction of the incoming airflow, further preventing the side air brake corresponding to the front side from deploying. Now, when the top air brake experiences the horizontal air flow the container is tilted in an opposite, backward direction. In this way, the free end of the side air brake corresponding to the front side is moved towards the horizontal air flow so that this side air brake can deploy. Hence, the top air brake increases the reliability of the container, in particular increases the reliability of all side air brakes reaching their deployed position, in particular during a parabolic descent trajectory.

An advantage of the container of the invention is that it has a simple structure and maintains structural integrity while descending in the air.

With the air brake structure as defined, i.e. flat panels, without an air brake profile or orientation for creating lift, the descent of the container in the air will have a large vertical component and a relatively small horizontal component, when considered in free fall with low horizontal wind speed. The air brake structure ensures the container to be non-rotating (around a vertical axis) during flight, and to keep an upright orientation. The air brake structure creates drag during dropping, instead of lift that could create rotation and/or drift. The non-rotation of the container has as additional advantage that on impact of the container on the ground, no possibly disruptive horizontal torsion forces are exerted on the box.

The relatively small horizontal component during descent allows the container to be dropped more accurately compared to rotating containers, or parachutes. Rotating containers or parachutes will have a larger horizontal component, or drift during their descent, which makes is more difficult to predict where the container will land. The structure of the container according to the present disclosure leads to a high predictability of a landing location of the container. Thus, a landing area may be relatively small, and risks of container landing outside the landing area and causing damage to goods or people are reduced.

The upper wall has the advantage that goods inside the container are prevented from falling out, also during a falling phase of the container.

In an embodiment of the container, each top air brake is freely pivotable around a top air brake pivot axis at the connection to said upper wall or said one of the side walls from a passive position, in which the top air brake extends substantially parallel to the corresponding upper wall, to a deployed position, in which the top air brake extends substantially transversely relative to the upper wall, by air flowing between the top air brake and the top wall.

An advantage of a pivotable top air brake is that when the top air brake is in the passive position, the container can be stored and transported more efficiently.

In an embodiment of the container, the top air brake is configured to extend perpendicular to the upper wall, and/or parallel to one of the side walls. Having the top air brake extending as such provides a large impact surface for the incoming airflow.

In an embodiment of the container, the panel dimensions of the top air brake correspond to, or are smaller than the dimensions of the upper wall of the container. An advantage of this embodiment is that the impact surface of the top air brake can be large while the top air brake has the least effect on the overall dimensions of the container. Hence the top air brake has little to no effect on the storage and transport of the container when the top air brake is in the passive position thereof.

In an embodiment of the container, each side air brake comprises a longitudinal flat panel and, in the deployed position of the side air brake, a cross-section of the side air brake at right angles to a central longitudinal line of the side air brake extends horizontally when the container is in an upright orientation, whereby the side air brakes, in their deployed position, are configured to not rotate the container around a vertical axis during the dropping, and to keep the container in the upright orientation.

In an embodiment of the container, each air brake, i.e. top air brake or side air brake, comprises a reinforcing unit to increase the bending stiffness of the air brake for preventing bulging of the air brake. Thus, the reinforcing unit in particular prevent the air brakes from bulging or deflecting. In this way, a large air brake area may be utilized which is beneficial from a drag resistance perspective.

In an embodiment of the container, each air brake panel comprises two opposite side edges, wherein the reinforcing unit comprises a pair of reinforcing flaps, and wherein the reinforcing flaps are connected to the respective opposite side edges and are configured to extend transversely to the air brake panel.

In an embodiment of the container, each reinforcing flap is foldably connected to a respective side edge of the air brake panel.

In an embodiment of the container, each pivotable air brake comprises a retaining unit to limit pivoting of the air brake beyond the deployed position thereof. Limiting a pivot angle between the air brakes and the side walls by the retaining units also allows for a large air brake area, in particular when the pivot angle is configured to be around 90 degrees.

In an embodiment of the container, each air brake panel comprises two opposite side edges, wherein the retaining unit comprises a pair of foldable retaining flaps, wherein each retaining flap is connected between a side wall and the respective side edge of the air brake panel.

In an embodiment of the container, each air brake comprises a retaining unit to limit pivoting of the air brake beyond the deployed position thereof, wherein the retaining unit comprises a pair of retaining flaps, wherein each retaining flap is foldably connected between a side wall and the respective reinforcing flap.

In an embodiment of the container, each top air brake comprises a retaining unit to limit pivoting of the top air brake beyond the deployed position thereof, wherein the retaining unit comprises a pair of retaining flaps, wherein each retaining flap is foldably connected between the upper wall and the respective reinforcing flap.

In an embodiment of the container, a lower part of the packing volume of the container comprises an absorption member configured to absorb an impact on landing of the container, and an upper part of the packing volume is configured to contain cargo. The absorption member may be placed inside the container as a separate piece.

The absorption member is beneficial for the goods inside the container, as the absorption member dissipates the energy of the goods upon impact of the container on the ground.

In an embodiment of the container, a ratio between a height of the lower part and a height of the upper part in the packing volume is changeable to adjust a absorption capacity of the container.

In an embodiment of the container, the cargo comprises one or more of a water container, a blanket, and a food box.

In an embodiment of the container, the absorption member comprises an interlocking structure, in particular a honeycomb structure.

In an embodiment of the container, the container comprises four side walls and four air brakes.

In an embodiment of the container, the side walls and the air brakes are shaped as flat panels.

In an embodiment of the container, each side wall of the container has a rectangular shape.

In an embodiment of the container, each air brake has a rectangular shape.

In an embodiment the container comprises a first top air brake comprising a first panel connected at one edge thereof to an edge of the upper wall or an edge of one of the side walls, and a second top air brake comprising a second panel connected at an edge thereof to an adjacent edge of the upper wall or an adjacent edge of an adjacent side wall, wherein the first panel and second panel are connected to each other via respective side edges and configured to extend substantially transversely from the upper wall to tilt the container during dropping around a horizontal axis for pivoting the side air brakes from the passive position thereof to the deployed position thereof.

In an embodiment of the container, in the passive position of the top air brake the reinforcing flaps are located between the upper wall and the top air brake.

In an embodiment of the container, in the passive position of the top air brake the reinforcing flaps are located within an area defined by the side walls.

In an embodiment of the container, in the passive position of the top air brake the retaining flaps are located between the upper wall and the top air brake.

In an embodiment of the container, in the passive position of the top air brake the retaining flaps are located within an area defined by the side walls.

In an embodiment of the container, in the deployed position of the side air brakes a height from the lower wall to a free end of the top air brake is greater than a height from the lower wall to a free end of the side air brakes.

The invention further relates to a method of dropping the container according to the invention from an aerial vehicle in horizontal flight, the method comprising the steps of:

releasing the container in an upright position, with the side air brakes being freely pivotable and extending parallel to the corresponding side walls in their passive position, from the aerial vehicle flying in horizontal flight; and allowing a horizontal air flow along the container to engage the top air brake to tilt the container in the air, whereby the side air brakes are brought into their deployed position.

The invention further relates to a kit of cardboard blanks for assembling the container according to the invention.

Advantages of making the container from a cardboard blank are low production costs, easy manufacturing, and efficient stackability and transportability.

In an embodiment, the kit of cardboard blanks comprises an integral body cardboard blank comprising the bottom wall, side walls and side air brakes of the container, and an integral top cardboard blank comprising the upper wall and the top air brake of the container.

These and other aspects of the invention will be more readily appreciated as the same becomes better understood by reference to the following detailed description and considered in connection with the accompanying drawings in which like reference symbols designate like parts.

BRIEF DESCRIPTION OF THE FIGURES

FIGS. 12A-12C depict perspective views of the container of FIG. 1 wherein a top air brake pivots from a passive position to a deployed position.

FIGS. 13A-13C depict perspective views of a fifth embodiment of a container according to the present invention, wherein a top air brake pivots from a passive position to a deployed position.

FIGS. 14A-14D depict perspective views of further embodiments of a container according to the present invention.

DETAILED DESCRIPTION OF THE FIGURES

In all figures, dashed lines represent folding lines about which respective parts interconnected across the folding line can be folded.

Figure 1:
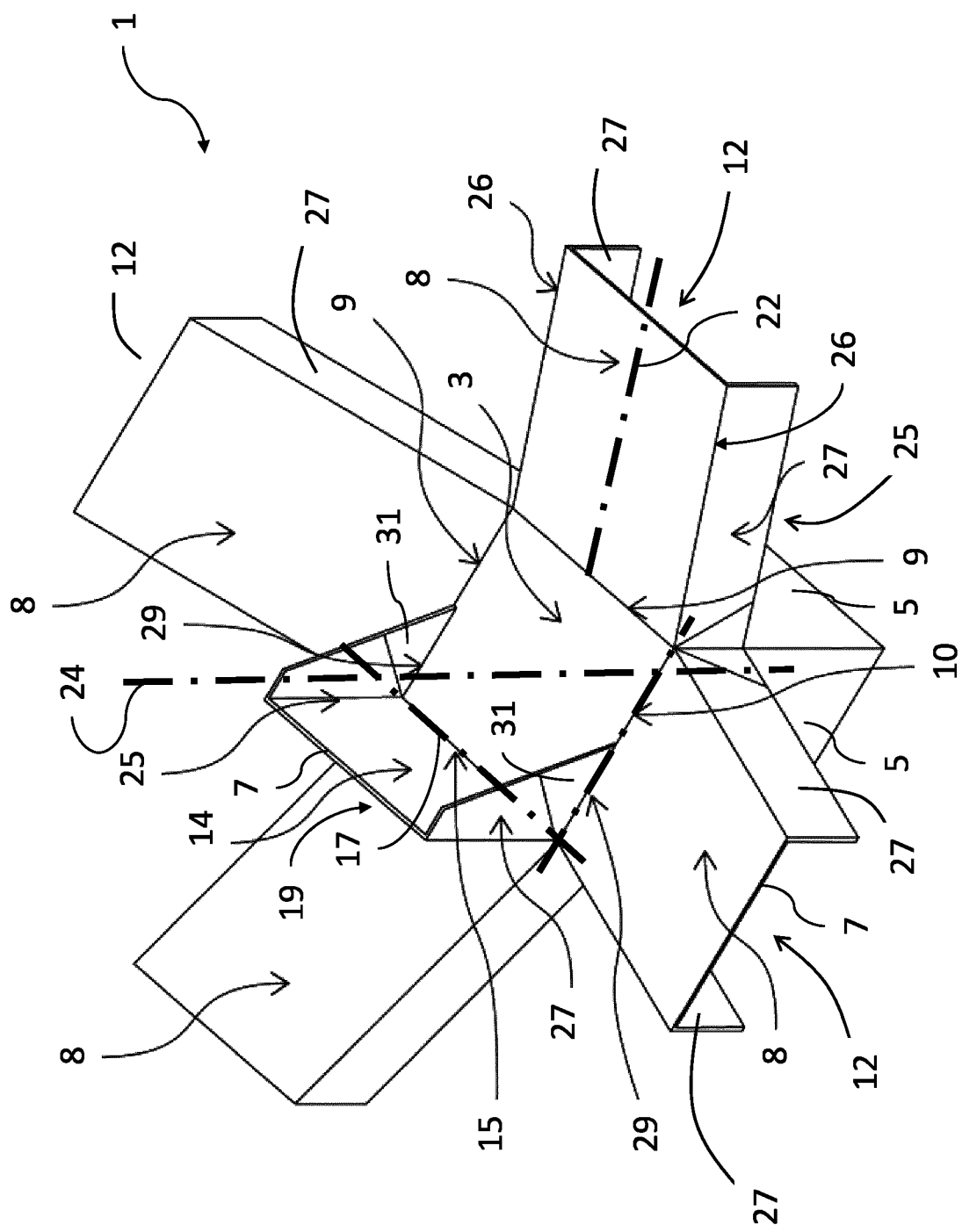
FIG. 1 depicts a perspective top view of an embodiment of a container according to the present invention.
Figure 2:
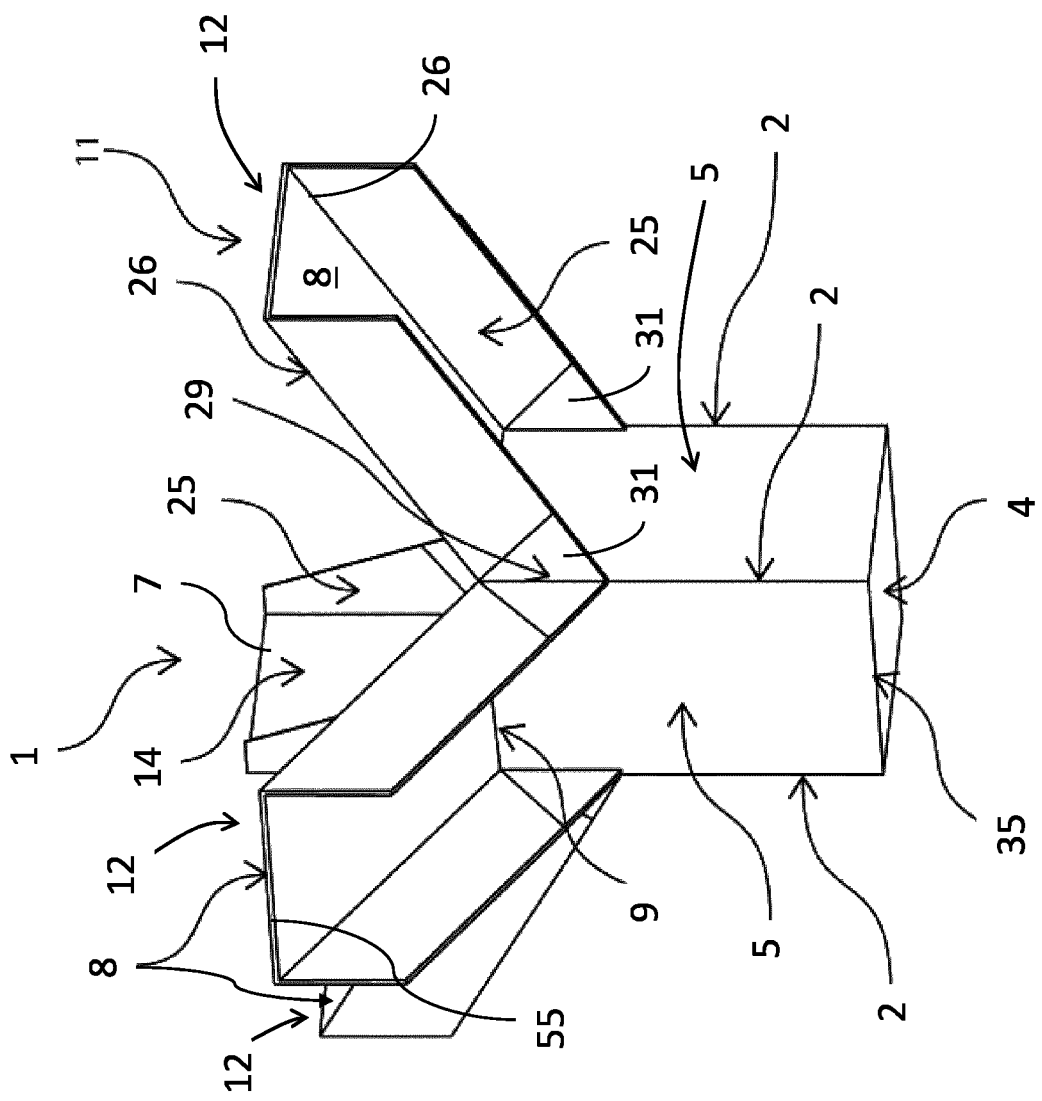
FIG. 2 depicts a perspective bottom view of the container of FIG. 1.

FIGS. 1 and 2 depict an example embodiment of a container 1 for dropping from an aerial vehicle in flight. The container 1 has an upper wall 3 and a lower wall 4 with both four edges 35. The container 1 has four side walls 5, wherein each side wall 5 has an upper edge 9, a lower edge 35 and two opposing side edges 2. Each side wall 5 extends upwardly from a corresponding lower edge 35 of the lower wall 4 and is connected at its lower edge 35 to the corresponding edge of the lower wall 4.

The container 1 has a plurality of air brakes 8, 14, wherein each air brake comprises a flat panel 7. The air brakes 8, 14 are comprised of side air brakes 8 of which the shown embodiment comprises four and a top air brake 14. The side walls 5 and the air brakes 8, 14 are shaped as flat panels 7. The flat panels 7 have a rectangular shape.

Each side air brake 8 is connected to a corresponding side wall 5 at or near an upper edge 9 thereof. In the shown embodiments the side air brakes 8 are integrally connected to their corresponding side wall 5. Each side air brake 8 is freely pivotable around a side air brake pivot axis 10 at or near the upper edge 9 of the corresponding side wall 5. Each side air brake 8 is pivotable from a passive position, in which the side air brake 8 extends substantially parallel to the corresponding side wall 5, to a deployed position 12, in which the side air brake 8 extends substantially transversely relative to the corresponding side wall 5. The pivoting of the side air brakes 8 may be induced by air flowing between the side air brake 8 and the corresponding side wall 5.

Each side air brake 8 comprises a longitudinal flat panel 7. In the deployed position 12 of the side air brake, a cross-section of the side air brake 8 at right angles to a central longitudinal line 22 of the side air brake 8 extends horizontally when the container 1 is in an upright orientation as shown in FIGS. 1 and 2. The side air brakes 8, in their deployed position 12, are configured to not rotate the container 1 around a vertical axis 24 during the dropping, and to keep the container 1 in the upright orientation. Therefore the side air brakes 8, or the flat panels 7, do not have a wing profile, and do not have an orientation, which could create said rotation.

When the container 1 is dropped using a vertical descent trajectory, i.e. from a hovering aerial vehicle or from a horizontally moving drone by a launching mechanism as disclosed in reference U.S. Pat. No. 9,896,182B1, the side air brakes 8 experience the same air flowing between said side air brakes 8 and their corresponding side wall 5. Therefore all side air brakes 8 will pivot substantially simultaneously to their deployed position 12.

Figure 3:
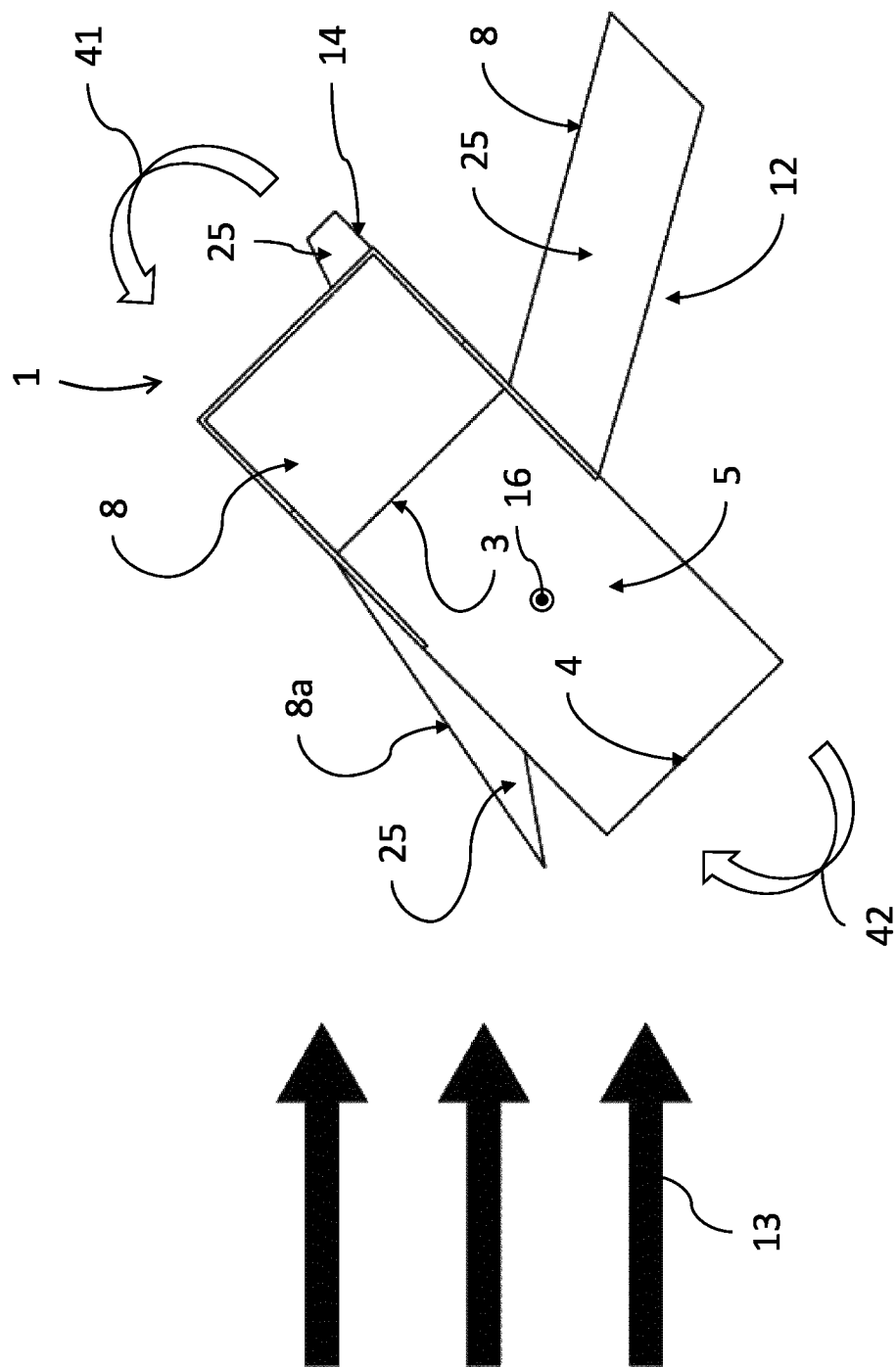
FIG. 3 depicts a side view of the container of FIG. 1 during dropping.

Turning to FIG. 3, if the container 1 is dropped using a substantially parabolic descent trajectory instead of a vertical descent trajectory, e.g. when the container 1 is dropped from a horizontally moving aerial vehicle with the same or similar horizontal velocity as the aerial vehicle, and with all side air brakes 8 in a passive position, the side air brake 8a in front (when seen in the moving direction) may be prevented from pivoting to its deployed position 12 because of the horizontal airflow 13 experienced due to the direction in which the container 1 is going and also by forward tilting, as indicated by arrow 41, of the container 1. The forward tilting occurs when the container 1 is released, wherein the bottom portion of the container 1 experiences the horizontal airflow 13 first. Hence the bottom portion of the container 1 moves backwards relative to the upper portion.

In order to prevent the front side air brake 8a from not deploying, the plurality of air brakes further comprises a top air brake 14. Said top air brake 14 is connected, here integrally connected, with one edge 15 thereof, to the upper wall 3, or to one of the side walls 5. The top air brake 14 is configured to extend substantially transversely from the upper wall 3 to tilt the container 1 during dropping around a horizontal axis 16 for pivoting the side air brakes 8 from the passive position thereof to the deployed position 12 thereof. Hence the top air brake 14 makes the container 1 tilt backwards, as indicated by arrow 42, about said horizontal axis 16 so that the air flow can flow between the front side air brake 8 and the corresponding side wall 5. The front side air brake 8 can therefore pivot from its passive position to the deployed position 12. In FIG. 3 the orientation of the container 1 is shown after the container 1 has pivoted backwards 42 such that the air flow 13 can flow between the front side air brake 8 and the corresponding side wall 5.

The top air brake 14 may be freely pivotable around a top air brake pivot axis 17 (see FIG. 1) at the connection to said upper wall 3 or said one of the side walls 5. The top air brake 14 may then be configured to pivot from a passive position 18 (FIG. 12A), in which the top air brake 14 extends substantially parallel to the corresponding upper wall 3, to a deployed position 19, in which the top air brake 14 extends substantially transversely relative to the upper wall 3. Pivoting of the top air brake 14 from the passive position to the deployed position 19 is induced by air flowing between the top air brake 14 and the upper wall 3.

In the shown embodiment, the top air brake 14 extends substantially perpendicular to the upper wall 3, and/or parallel to one of the side walls 5. This is an effective configuration with respect to the incoming air flow.

In the deployed position 12, 19 a height from the lower wall 4 to a free end 54 of the top air brake 14 is greater than a height from the lower wall 4 to a free end 55 of the side air brakes 8.

The panel dimensions of the top air brake 14 may correspond to, or may be smaller than, the dimensions of the upper wall 3 of the container 1. The panel dimensions are selected such as to provide the tilting effect around horizontal axis 16. FIG. 14C shows an embodiment of a longer top air brake.

Each side air brake 8 is provided with a reinforcing unit 25 to increase the bending stiffness of the side air brake 8 for preventing bulging of the side air brake 8.

In the shown embodiments, likewise the top air brake 14 comprises a reinforcing unit 25 to increase the bending stiffness of the top air brake 14 for preventing bulging of the top air brake 14.

Each air brake panel comprises two opposite side edges 26.

The reinforcing unit 25 comprises a pair of reinforcing flaps 27 which are connected to the respective opposite side edges 26. The reinforcing flaps 27 are configured to extend substantially transversely to the air brake panel.

Each reinforcing flap 27 is foldably connected to a respective side edge of the air brake panel. In this way, the reinforcing flap 27 can fold about the side edge 26. The reinforcing flap 27 is configured to be folded on the air brake which is beneficial for storage and transportation.

If the reinforcing flap 27 is folded such that it is located between the air brake and the corresponding wall, resilience of the fold biases the air brake away from the wall via the reinforcing flap 27. This improves the deployment of the air brake.

Each air brake comprises a retaining unit 29 to limit pivoting of the air brake beyond the deployed position 12 thereof.

The retaining unit 29 comprises a pair of foldable retaining flaps 31, wherein each retaining flap 31 is connected between a wall and the respective side edge 26 of the air brake panel.

Each retaining flap 31 of the side air brakes 8 is foldably connected between a side wall 5 and the respective reinforcing flap.

Each top air brake 14 comprises a retaining unit 29 to limit pivoting of the top air brake 14 beyond the deployed position 12 thereof. The retaining unit 29 comprises a pair of retaining flaps 31, wherein each retaining flap 31 is foldably connected between the upper wall 3 and the respective reinforcing flap.

Figure 4:
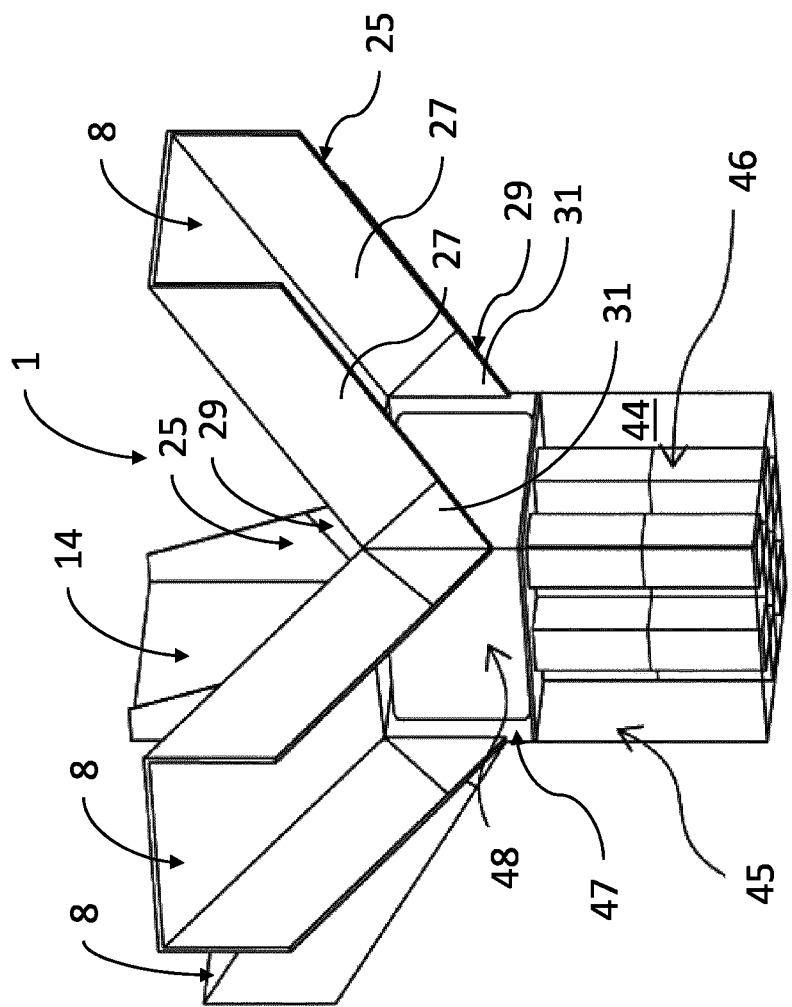
FIG. 4 depicts a perspective see-through view, similar to FIG. 2, of an embodiment of a container according to the present invention.

FIG. 4 depicts a see-through view of a container 1 according to the present invention showing a packing volume 44. A lower part of the packing volume of the container 1 may comprise a relatively light-weight absorption member 46 configured to absorb an impact on landing of the container 1, and an upper part of the packing volume is configured to contain relatively heavy cargo 48. The absorption member 46 may be placed inside the container 1 as a separate piece.

Although the absorption member 46 is beneficial for the goods inside the container 1, the absorption member 46 has an effect on the location of the centre of gravity of the container 1. Because the cargo 48 is generally heavier than the absorption member 46, the centre of gravity of the container 1 is relatively high due to the absorption member 46. This has an additional negative effect on the orientation of the container 1 during the drop, as the heavier upper part 47 containing the cargo 48 tends to tilt the container 1 towards an orientation wherein the cargo is located below the absorption member 46. The encountered horizontal air flow 13 on the bottom section of the container 1 during the drop enhances this effect. The top air brake 14 is configured to counteract this negative tilting effect.

The cargo 48 may comprise one or more of a water container, a blanket, and a food box.

The absorption member 46 may have an interlocking structure made of a light-weight material, in particular a honeycomb structure made of cardboard.

The present invention further provides a method of dropping the container 1 from an aerial vehicle in flight. The method comprising releasing the container 1, with the side air brakes 8 extending parallel to the corresponding side walls 5, from the aerial vehicle while the container 1 is in an upright position. The next step is allowing air flowing along the container 1 to engage the top air brake 14 to tilt the container 1 to bring the side air brakes 8 into a deployed position 12.

Figure 5:
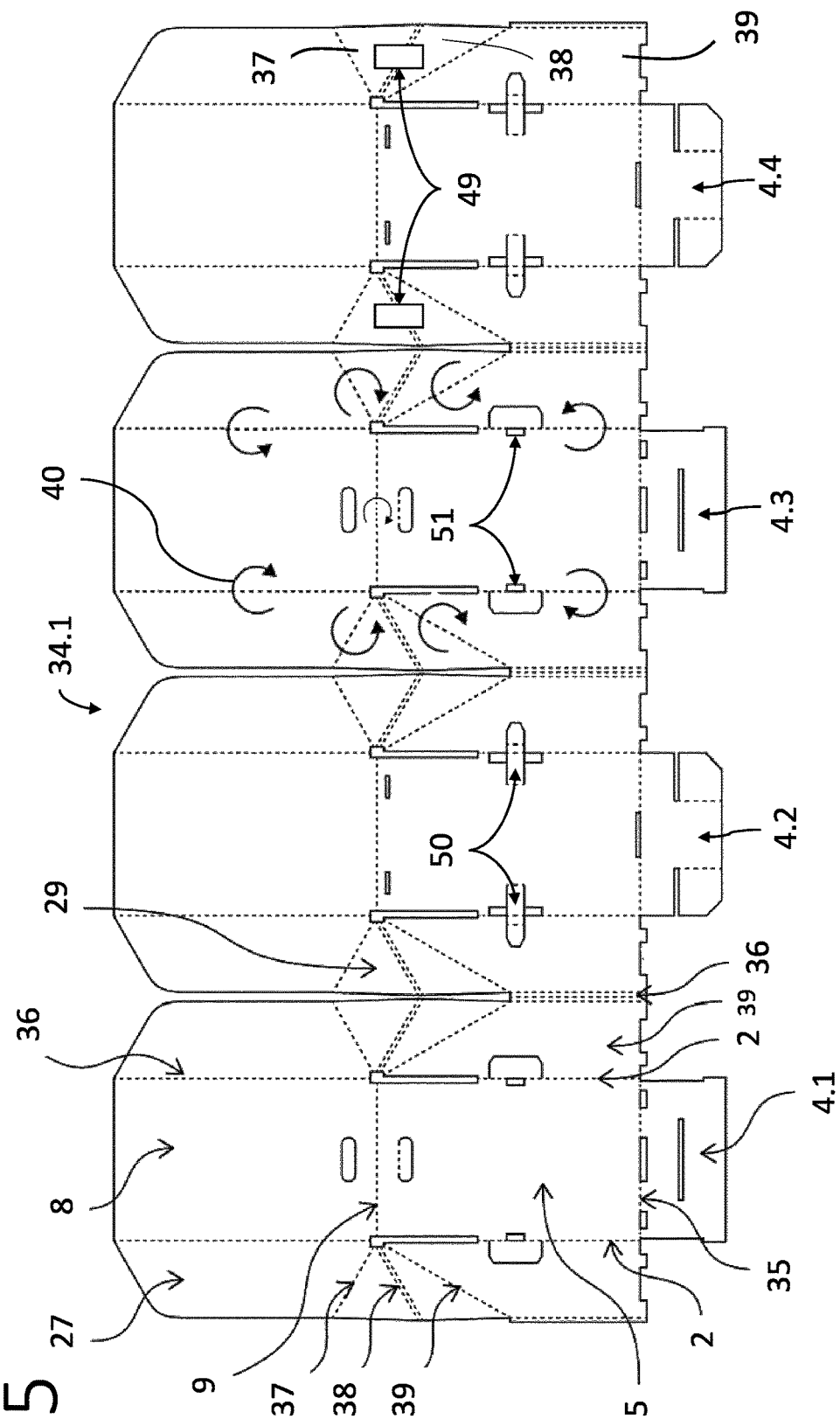
FIG. 5 depicts a top view of an embodiment of an integral body cardboard blank according to the present invention
Figure 7:
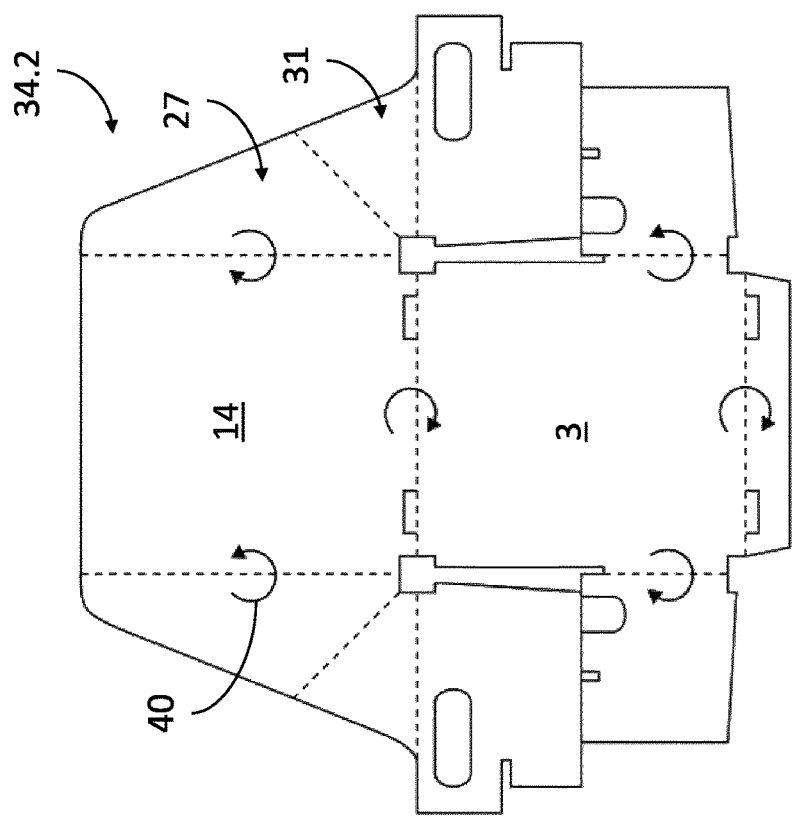
FIG. 7 depicts a top view of an embodiment of an integral top cardboard blank according to the present invention and illustrates a method of folding thereof.
Figure 6:
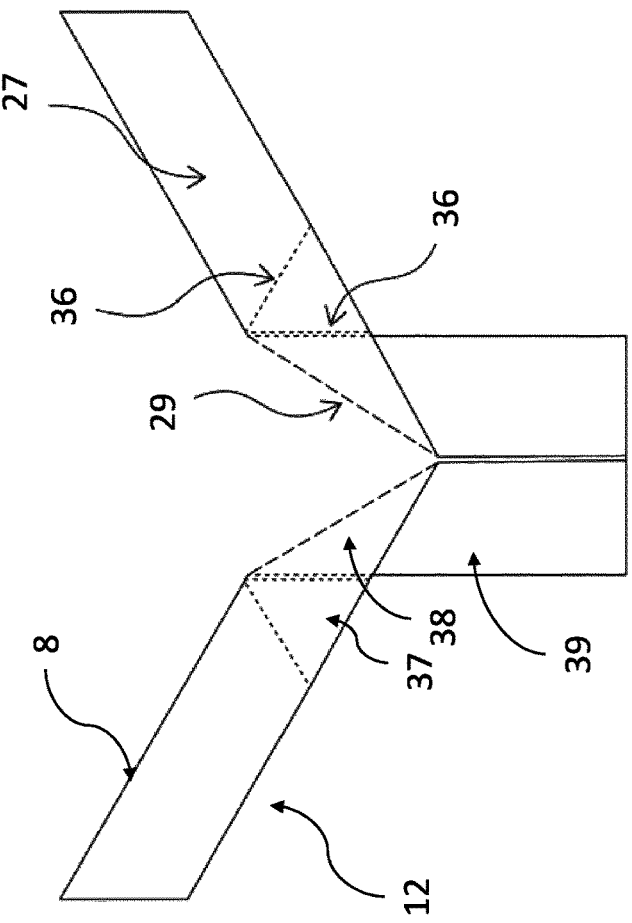
FIG. 6 illustrates a method of folding of a part of the integral body cardboard blank of FIG. 5.

Referring to FIGS. 5 to 7, a kit of cardboard blanks for assembling the container 1 according to the invention is shown. The dashed lines are folding lines 36 via which the indicated parts are integrally connected.

The kit of cardboard blanks comprises an integral body cardboard blank 34.1 as shown in FIG. 5. The integral body cardboard blank 34.1 comprises the lower wall 4 provided by a plurality of lower wall parts 4.1, 4.2, 4.3, 4.4, side walls 5 and side air brakes 8 of the container 1. The circular arrows 40 illustrate the method of folding the blank 34.1.

The reinforcing flaps 27 are connected to the side air brakes 8 and the top air brake 14, respectively. Each retaining flap 31 is connected to a reinforcing flap 27 and to a side wall 5. The retaining flap 31 comprises a first, second and third retaining part 37, 38, 39 which are foldable relative to each other. The foldable connection between the first and second retaining part may be reinforced with for example an adhesive tape 49.

Male connecting members 50 and female connecting members 51 are configured to be connected to each other. This allows the integral body cardboard blank to be folded and constructed into a part of the container 1 without the need for external parts like adhesive tape, tie-wraps, glue, or staples.

FIG. 6 shows a side view of the side air brakes 8, reinforcing unit 25 and retaining unit 29 when folded, wherein the side air brakes 8 are in the deployed position 12.

The kit of cardboard blanks further comprises an integral top cardboard blank 34.2 as shown in FIG. 7. The integral top cardboard blank 34.2 comprises the upper wall 3 and the top air brake 14 of the container 1. Circular shaped arrows 40 indicate the method of folding.

The reinforcing flap 27 is integrally connected to the top air brake 14. The retaining flap 31 is connected to the reinforcing flap.

Figure 8:
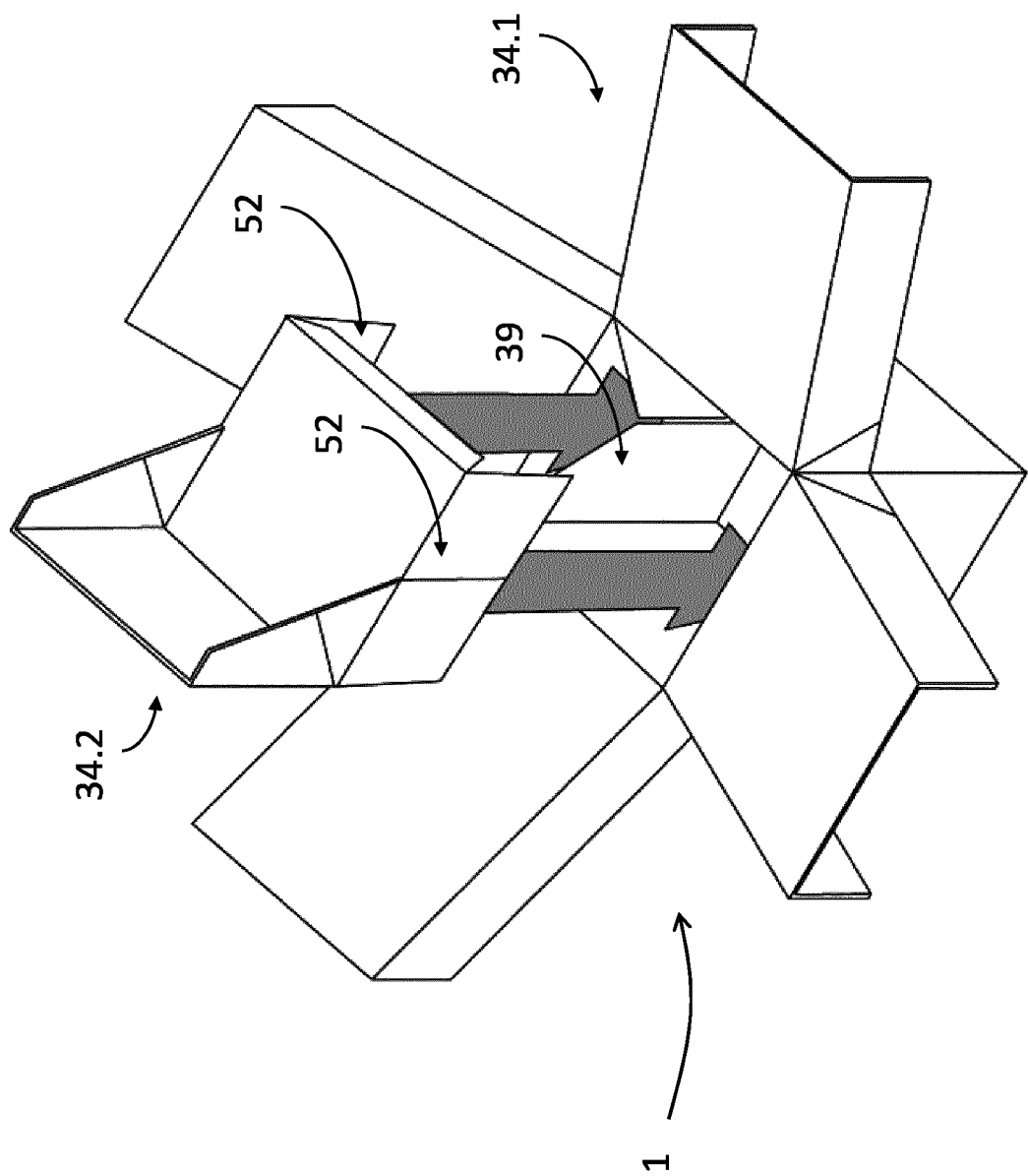
FIG. 8 depicts a method of constructing a container according to the present invention.

FIG. 8 illustrates the assembly of the folded integral body cardboard blank 34.1 and the folded integral top cardboard blank 34.2. Side wall parts 52 of the folded integral top cardboard blank are inserted between the third retaining parts 39 and the corresponding side wall 5, as indicated by the broad arrows.

Figure 9:
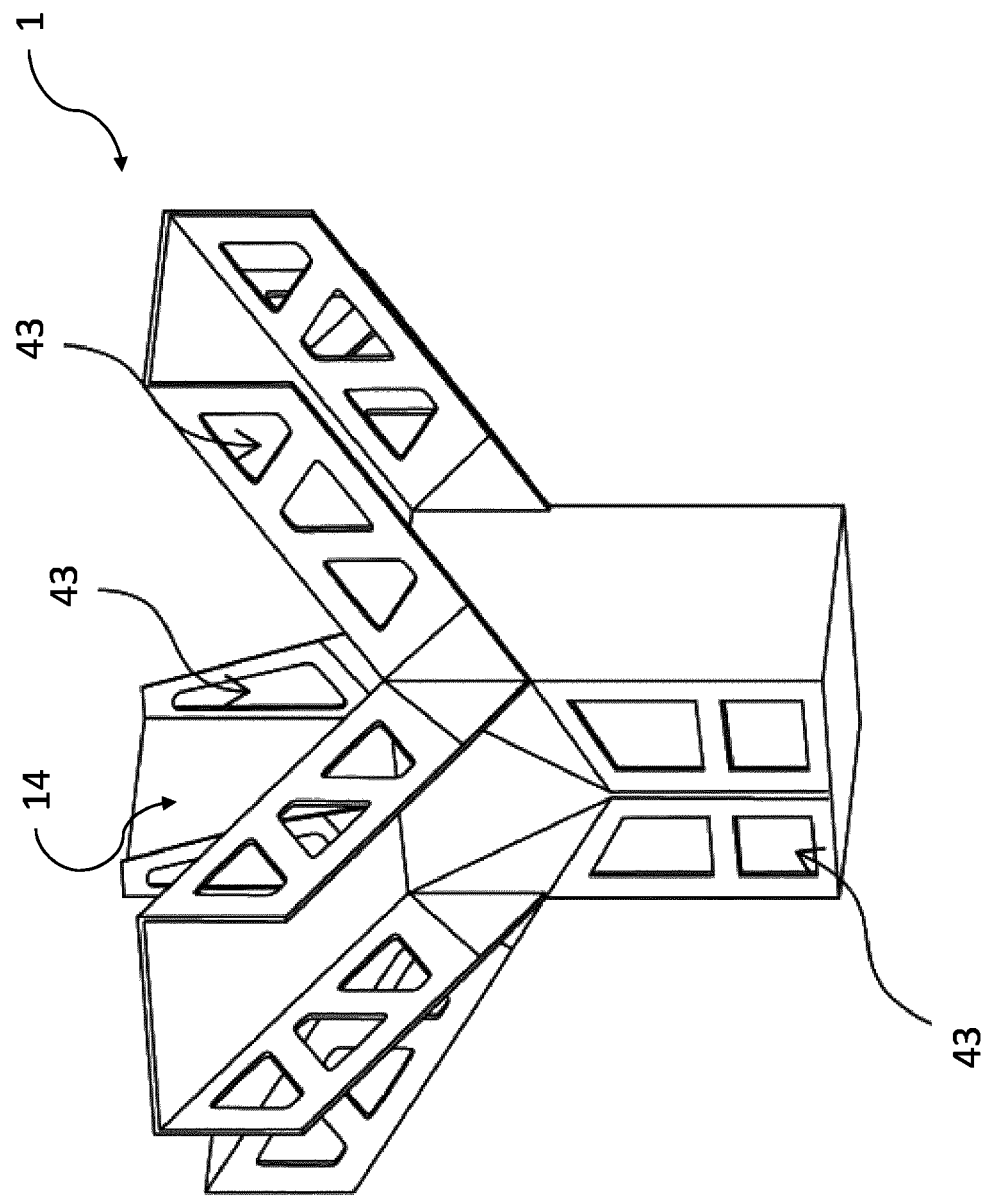
FIG. 9 depicts a perspective bottom view of a second embodiment of the container according to the present invention.
Figure 10:
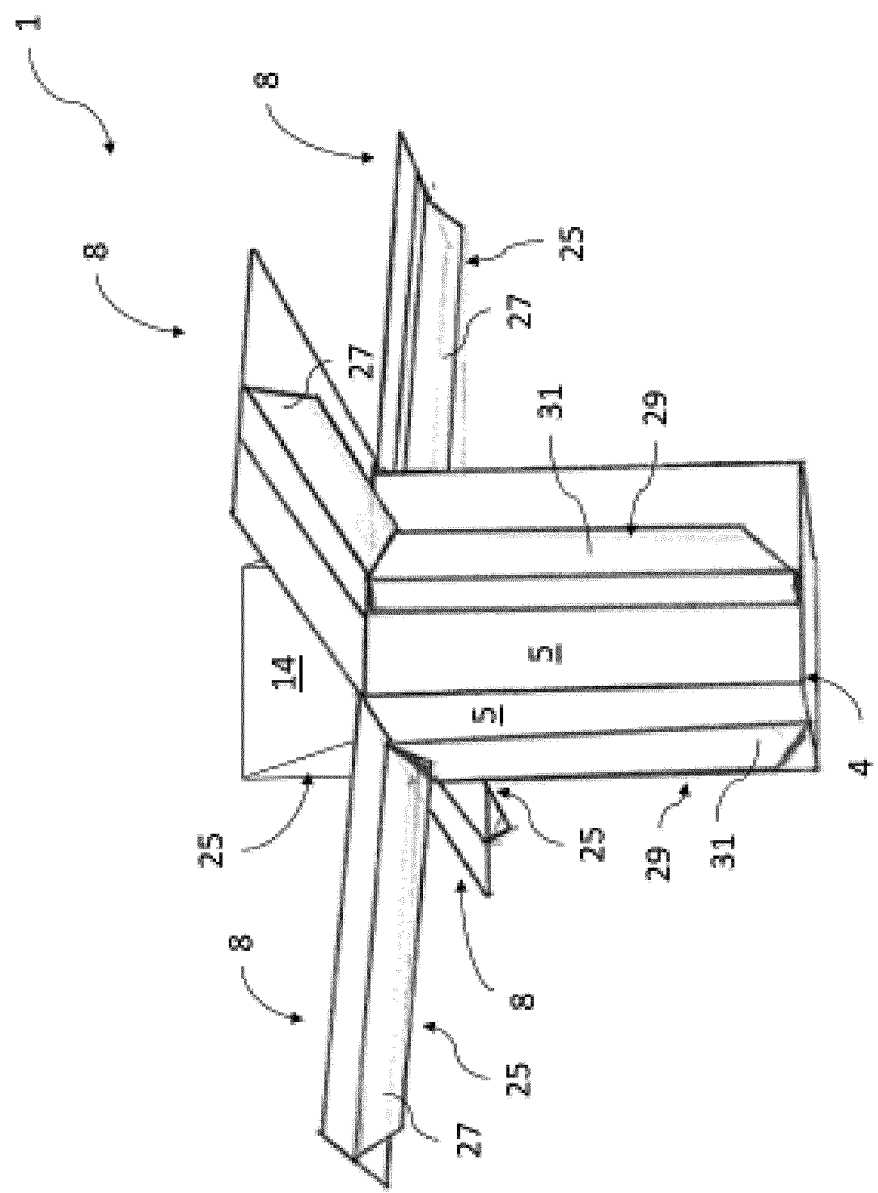
FIG. 10 depicts a perspective bottom view of a third embodiment of the container according to the present invention.
Figure 11:
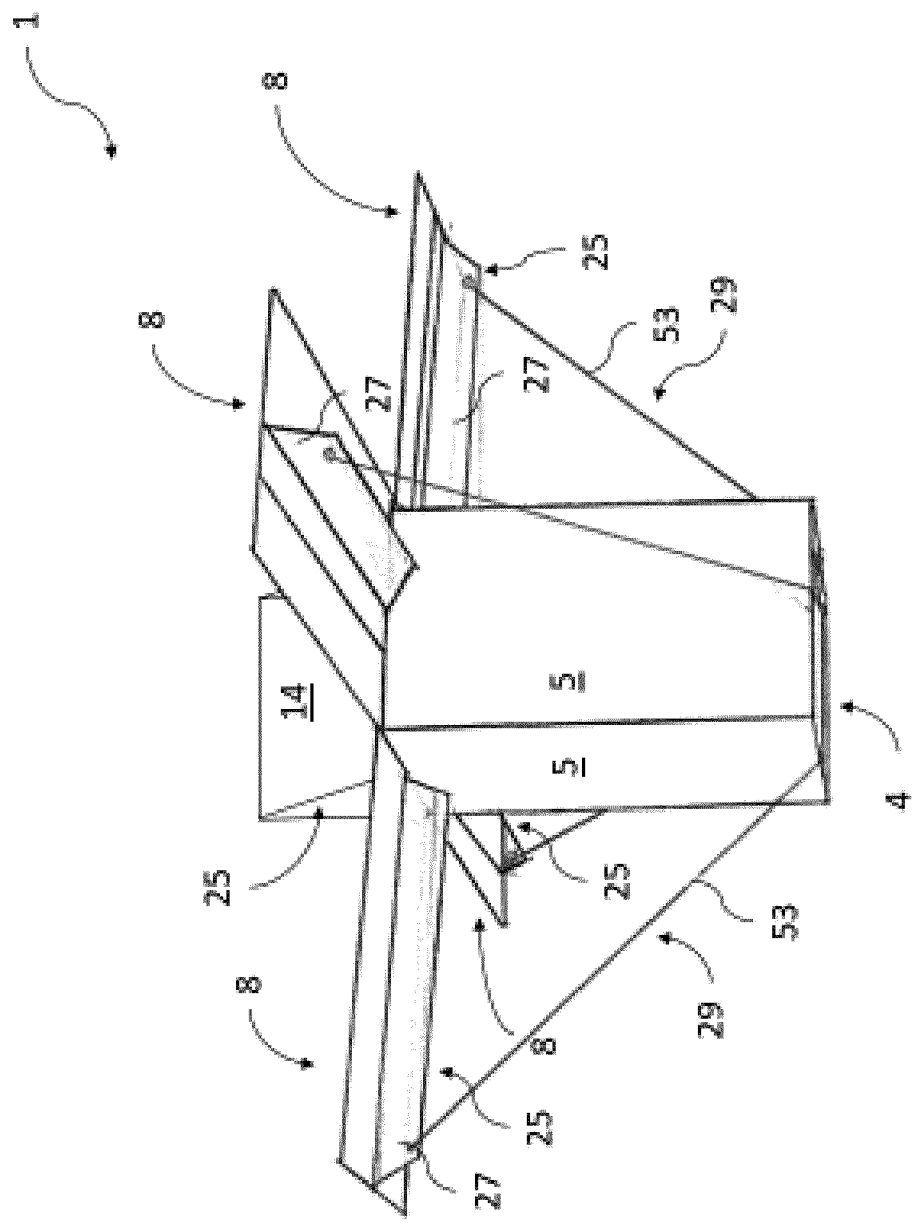
FIG. 11 depicts a perspective bottom view of a fourth embodiment of the container according to the present invention.

FIGS. 9-11 show other embodiments of the container 1 according to the present invention.

The embodiment of the container 1 of FIG. 9 comprises several cut outs 43 to reduce the weight of the container 1.

The embodiment of the container 1 of FIG. 10 comprises different reinforcing units 25 and retaining units 29. Both the reinforcing unit 25 and retaining unit 29 comprise a respective reinforcing flap 27 and retaining flap 31. The reinforcing flap 27 is connected to a lower side of the side air brake 8, and extends transversely to the side air brake from a central longitudinal axis thereof. The retaining flap 31 is connected to the side wall 5 and to the reinforcing flap 27. The container 1 comprises a top air brake 14 with a reinforcing unit 25 and retaining unit (not shown).

The embodiment of the container 1 of FIG. 11 comprises a tether 53 as retaining unit 29. The tether 53 connects the reinforcing unit 25 to the side wall 5 or lower wall 4. The container 1 comprises a top air brake 14 with a reinforcing unit 25 and retaining unit (not shown).

FIGS. 12A-12C depict the pivoting of the top air brake 14 from the passive position 18 (12A) to the deployed position 19 (FIG. 12C) for the container 1 of FIG. 1. The side air brakes 8 are shown in their passive position 11.

FIGS. 13A-13C depict a fifth embodiment of a container according to the invention, wherein the top air brake is pivoted from the passive position 18 to the deployed position 19. Said fifth embodiment comprises a first top air brake 14.1 and a second top air brake 14.2. The first top air brake 14.1 has a first flat panel 7.1 connected at one edge 15.1 thereof to an edge 9.1 of the upper wall 3 or an edge of one of the side walls 5. The second air brake 14.2 has a second panel 7.2 connected at an edge 15.2 thereof to an adjacent edge 9.2 of the upper wall or an adjacent edge of an adjacent side wall, wherein the first panel and second panel are connected to each other via respective side edges and configured to extend substantially transversely from the upper wall to tilt the container during dropping around a horizontal axis for pivoting the side air brakes from the passive position thereof to the deployed position thereof.

At the remaining edges 9.3, 9.4 of the upper wall 3 or the side walls 5 the retaining flaps 31 are connected. The reinforcing flaps 29 are connected at opposite edges 26 of the top air brake 14.

FIG. 13B shows how while the first top air brake 14.1 pivots towards the deployed position the second top air brake 14.2 both pivots and unfolds via the dashed folding line 36.

FIGS. 14A-14D show further embodiments of the top air brake 14, wherein the rest of the container except the top air brake may be similar to the embodiment of FIG. 1. The top air brakes are in their deployed position 19.

The top air brake 14 of FIG. 14A has cut outs 43 in its flat panel. This requires less material.

FIG. 14B shows the top air brake 14 being connected to reinforcing flaps 31. The retaining flaps 29 connect the top air brake 14 via the reinforcing flap 31 to the upper wall 3 or the side walls 5. A gripping cut out 56 is provided in the reinforcing and retaining flaps for the user to be able to easily remove the top air brake and the upper wall from the rest of the container. The top air brake and upper wall are connected.

FIG. 14D depicts a container comprising three top air brakes 14.1, 14.2, 14.3, wherein the outer air brakes 14.2, 14.3 further comprise the reinforcing flap 29 and retaining flap 31.

In the passive position 18 of the top air brake 14 the reinforcing unit 25, or reinforcing flaps 27 are located between the upper wall 3 and the top air brake 14. This is also the case for the retaining unit 29, or retaining flaps 31.

The reinforcing flaps 27 and retaining flaps 31 are located within an area defined by the side walls 5.

As explained in detail above, a container 1 for dropping from an aerial vehicle comprises a bottom wall, an upper wall 3 and a plurality of side walls 5. Air brakes are connected to the upper edges 9 of the side walls 5 to allow pivoting of the air brake between a passive position, in which the air brake extends along the corresponding side wall 5, to a deployed position 12, in which the air brake extends substantially transversely relative to the corresponding side wall 5. A top air brake 14 extends substantially transversely from the upper wall 3 to tilt the container 1 during dropping around a horizontal axis 16 for pivoting the side air brakes 8 from the passive position thereof to the deployed position 12 thereof.

As required, detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention. Further, the terms and phrases used herein are not intended to be limiting, but rather, to provide an understandable description of the invention.

The terms "a"/"an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A container for dropping from an aerial vehicle in flight, the container comprising:
   an upper wall, a lower wall, and a plurality of side walls; and
   a plurality of air brakes, wherein each air brake comprises a flat panel, the plurality of air brakes comprising:
      a plurality of side air brakes, wherein each side air brake comprises a longitudinal panel and is connected to a corresponding side wall at or near an upper edge thereof, and wherein each side air brake is pivotable around a side air brake pivot axis at or near the upper edge of the corresponding side wall from a passive position, in which the side air brake extends substantially parallel to the corresponding side wall, to a deployed position, in which the side air brake extends substantially transversely relative to the corresponding side wall, and in which a cross-section of the side air brake at right angles to a central longitudinal line of the side air brake extends horizontally when the container is in an upright position, whereby the side air brakes, in their deployed position, are configured to not rotate the container around a vertical axis during the dropping, and to keep the container in the upright orientation,
   wherein each side air brake is freely pivotable around the side air brake pivot axis, and that the plurality of air brakes further comprises:
      a top air brake connected, with one edge thereof, to the upper wall or one of the side walls, and configured to extend substantially transversely from the upper wall, to tilt the container having a horizontal velocity during dropping around a horizontal axis for pivoting the side air brakes from the passive position thereof to the deployed position thereof by air flowing between the side air brake and the corresponding side wall.

2. The container according to claim 1, wherein each top air brake is freely pivotable around a top air brake pivot axis at the connection to said upper wall or said one of the side walls from a passive position, in which the top air brake extends substantially parallel to the corresponding upper wall, to a deployed position, in which the top air brake extends substantially transversely relative to the upper wall, by air flowing between the top air brake and the top wall.

3. The container according to claim 1, wherein the top air brake is configured to extend perpendicular to the upper wall, and/or parallel to one of the side walls.

4. The container according to claim 1, wherein the panel dimensions of the top air brake correspond to the dimensions of the upper wall of the container.

5. The container according to claim 1, wherein each air brake comprises a reinforcing unit to increase the bending stiffness of the air brake for preventing bulging of the air brake.

6. The container according to claim 5, wherein each air brake panel comprises two opposite side edges, wherein the reinforcing unit comprises a pair of reinforcing flaps, and wherein the reinforcing flaps are connected to the respective opposite side edges and are configured to extend transversely to the air brake panel.

7. The container according to claim 6, wherein each reinforcing flap is foldably connected to a respective side edge of the air brake panel.

8. The container according to claim 7, wherein in the passive position of the top air brake the reinforcing flaps are located between the upper wall and the top air brake.

9. The container according to claim 8, wherein in the passive position of the top air brake the reinforcing flaps are located within the area defined by the side walls.

10. The container according to claim 6, wherein each air brake comprises a retaining unit to limit pivoting of the air brake beyond the deployed position thereof, wherein the retaining unit comprises a pair of retaining flaps, wherein each retaining flap is foldably connected between a side wall and the respective reinforcing flap.

11. The container according to claim 6, wherein each top air brake comprises a retaining unit to limit pivoting of the top air brake beyond the deployed position thereof, wherein the retaining unit comprises a pair of retaining flaps, wherein each retaining flap is foldably connected between the upper wall and the respective reinforcing flap.

12. The container according to claim 1, wherein each air brake comprises a retaining unit to limit pivoting of the air brake beyond the deployed position thereof.

13. The container according to claim 12, wherein each air brake panel comprises two opposite side edges, wherein the retaining unit comprises a pair of foldable retaining flaps, wherein each retaining flap is connected between a side wall and the respective side edge of the air brake panel.

14. The container according to claim 13, wherein in the passive position of the top air brake the retaining flaps are located between the upper wall and the top air brake.

15. The container according to claim 14, wherein in the passive position of the top air brake the retaining flaps are located within the area defined by the side walls.

16. The container according to claim 1, comprising a first top air brake comprising a first panel connected at one edge thereof to an edge of the upper wall or an edge of one of the side walls, and a second top air brake comprising a second panel connected at an edge thereof to an adjacent edge of the upper wall or an adjacent edge of an adjacent side wall, wherein the first panel and second panel are connected to each other via respective side edges and configured to extend substantially transversely from the upper wall to tilt the container during dropping around a horizontal axis for pivoting the side air brakes from the passive position thereof to the deployed position thereof.

17. The container according to claim 1, wherein in the deployed position of the side air brakes, a height from the lower wall to a free end of the top air brake is greater than a height from the lower wall to a free end of the side air brakes.

18. A method of dropping the container according to claim 1 from an aerial vehicle in horizontal flight, the method comprising the steps of:
　releasing the container in an upright position, with the side air brakes being freely pivotable and extending parallel to the corresponding side walls in their passive position, from the aerial vehicle flying in horizontal flight; and
　allowing a horizontal air flow along the container to engage the top air brake to tilt the container in the air, whereby the side air brakes are brought into their deployed position.

19. A kit of cardboard blanks for assembling the container according to claim 1.

20. The kit of cardboard blanks according to claim 19, comprising an integral body cardboard blank comprising the bottom wall, side walls and side air brakes of the container, and an integral top cardboard blank comprising the upper wall and the top air brake of the container.

\* \* \* \* \*